US007453478B2

(12) United States Patent
Martin et al.

(10) Patent No.: US 7,453,478 B2
(45) Date of Patent: Nov. 18, 2008

(54) ADDRESS GENERATION IN A LIGHT MODULATOR

(75) Inventors: Eric T. Martin, Corvallis, OR (US); Eugene J. Mar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 10/902,349

(22) Filed: Jul. 29, 2004

(65) Prior Publication Data

US 2006/0022965 A1 Feb. 2, 2006

(51) Int. Cl.
*G09G 5/10* (2006.01)
*G02F 1/00* (2006.01)

(52) U.S. Cl. .......................... 345/692; 345/84; 345/85; 345/108; 345/690; 345/698; 348/758; 348/759

(58) Field of Classification Search .................. 345/84, 345/85, 87, 108, 690, 692, 698; 348/700, 348/701, 744, 758, 759
See application file for complete search history.

(56) References Cited

U.S. PATENT DOCUMENTS 4,373,784 A 2/1983 Nonomura et al.
4,662,746 A 5/1987 Hornbeck
4,811,003 A 3/1989 Strathman et al.
4,956,619 A 9/1990 Hornbeck
5,061,049 A 10/1991 Hornbeck
5,083,857 A 1/1992 Hornbeck
5,146,356 A 9/1992 Carlson
5,317,409 A 5/1994 Macocs
5,386,253 A 1/1995 Fielding
5,490,009 A 2/1996 Venkateswar et al.
5,530,482 A 6/1996 Gove et al.
5,557,353 A 9/1996 Stahl
5,689,283 A 11/1997 Shirochi
5,729,245 A 3/1998 Gove et al.
5,742,274 A 4/1998 Henry et al.
5,748,164 A * 5/1998 Handschy et al. ............. 345/89
5,757,355 A 5/1998 Ogura et al.

(Continued)

FOREIGN PATENT DOCUMENTS

EP 1001306 A2 5/2000

OTHER PUBLICATIONS

L.M. Chen and S. Hasagawa, "Visual Resolution Limits for Color Matrix Displays", "One Panel Projectors" Displays, Technologies, and Applications, vol. 13, pp. 221-226, 1992.

(Continued)

*Primary Examiner*—My-Chau T Tran

(57) ABSTRACT

A light modulator includes a control unit configured to receive an image input signal, and an array having a plurality of pixels arranged in a plurality of rows. The control unit is configured to provide a first address associated with the image input signal to the array in response to detecting a first mode of operation, and the control unit is configured to provide a second address associated with the image input signal to the array in response to detecting a second mode of operation. The array is configured to drive a first one of the plurality of rows in response to receiving the first address, and the array is configured to drive the first one of the plurality of rows and a second one of the plurality of rows in response to receiving the second address.

26 Claims, 8 Drawing Sheets

U.S. PATENT DOCUMENTS

| | | | | |
|---|---|---|---|---|
| 5,874,933 A * | 2/1999 | Hirai et al. | 345/89 |
| 5,883,609 A | 3/1999 | Asada | |
| 5,912,773 A | 6/1999 | Barnett et al. | |
| 5,920,365 A | 7/1999 | Eriksson | |
| 5,953,148 A | 9/1999 | Moseley et al. | |
| 5,978,518 A | 11/1999 | Oliyide et al. | |
| 6,025,951 A | 2/2000 | Swart et al. | |
| 6,067,143 A | 5/2000 | Tomita | |
| 6,104,375 A | 8/2000 | Lam | |
| 6,107,979 A | 8/2000 | Chiu | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,239,783 B1 | 5/2001 | Hill et al. | |
| 6,243,055 B1 | 6/2001 | Fergason | |
| 6,313,888 B1 | 11/2001 | Tabata | |
| 6,384,816 B1 | 5/2002 | Tabata | |
| 6,393,145 B2 | 5/2002 | Betrisey et al. | |
| 6,522,356 B1 | 2/2003 | Watanabe | |
| 6,535,187 B1 * | 3/2003 | Wood | 345/84 |
| 6,657,603 B1 | 12/2003 | Demetrescu et al. | |
| 6,755,539 B2 * | 6/2004 | Brennesholtz | 353/98 |
| 6,825,835 B2 | 11/2004 | Sano et al. | |
| 6,952,194 B1 * | 10/2005 | Yamazaki et al. | 345/92 |
| 2001/0038374 A1 | 11/2001 | Fisekovic | |
| 2003/0011614 A1 | 1/2003 | Itoh et al. | |
| 2003/0020809 A1 | 1/2003 | Gibbon et al. | |
| 2003/0076325 A1 | 4/2003 | Thrasher | |
| 2003/0090597 A1 | 5/2003 | Katoh et al. | |
| 2003/0133060 A1 | 7/2003 | Shimada | |
| 2004/0041760 A1 * | 3/2004 | Tsumura et al. | 345/87 |

OTHER PUBLICATIONS

A. Yasuda et al., "FLC Wobbling for High-Resolution Projectors", Journal of the SID 5/3 1997, pp. 299-305.

T. Tokita et al., "P-108: FLC Resolution-Enhancing Device for Projection Displays", SID 02 Digest 2002, pp. 638-641.

D.H. Kelly, "Motion and Vision—II. Stabilized Spatio-Temporal Threshold Surface," Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

* cited by examiner

ADDRESS GENERATION IN A LIGHT MODULATOR

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD; U.S. patent application Ser. No. 10/242,195, filed on Sep. 11, 2002, entitled IMAGE DISPLAY SYSTEM AND METHOD; U.S. patent application Ser. No. 10/242,545, filed on Sep. 11, 2002, entitled IMAGE DISPLAY SYSTEM AND METHOD; U.S. patent application Ser. No. 10/631,681, filed Jul. 31, 2003, entitled GENERATING AND DISPLAYING SPATIALLY OFFSET SUB-FRAMES; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES; U.S. patent application Ser. No. 10/672,544, filed Sep. 26, 2003, entitled GENERATING AND DISPLAYING SPATIALLY OFFSET SUB-FRAMES; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30,2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; U.S. patent application Ser. No. 10/820,952, filed Apr. 8, 2004, entitled GENERATING AND DISPLAYING SPATIALLY OFFSET SUB-FRAMES; U.S. patent application Ser. No. 10/864,125, filed Jun. 9, 2004, entitled GENERATING AND DISPLAYING SPATIALLY OFFSET SUB-FRAMES; U.S. patent application Ser. No. 10/868,719, filed Jun. 15, 2004, entitled GENERATING AND DISPLAYING SPATIALLY OFFSET SUB-FRAMES, and U.S. patent application Ser. No. 10/868,638, filed Jun. 15, 2004, entitled GENERATING AND DISPLAYING SPATIALLY OFFSET SUB-FRAMES. Each of the above U.S. patent applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image needs to be increased. Increasing a resolution of the display device, however, increases a cost and complexity of the display device. In addition, higher resolution image data may not be available and/or may be difficult to generate.

At times, certain display techniques may be used to increase the resolution of various types of graphical images. Display devices, however, may not include specialized components that would most efficiently implement these techniques. It would be desirable to be able to operate one or more components of a display device in ways suited for a display technique.

DETAILED DESCRIPTION

In the following detailed description of certain exemplary embodiments, reference is made to the accompanying drawings, which form a part hereof, and in which is shown by way of illustration specific examples in which the methods and apparatuses may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. Sub-frame generation, for example, as provided by the exemplary methods and apparatuses herein, is accomplished in a manner such that appropriate values are determined for the sub-frames. Thus, the displayed sub-frames are close in appearance to how the high-resolution image from which the sub-frames were derived would have appeared if directly displayed.

An exemplary embodiment of a display system that provides the appearance of enhanced resolution through temporal and spatial shifting of sub-frames is described in the U.S. patent applications cited above, and is summarized below with reference to FIGS. 1-4E.

Figure 1:
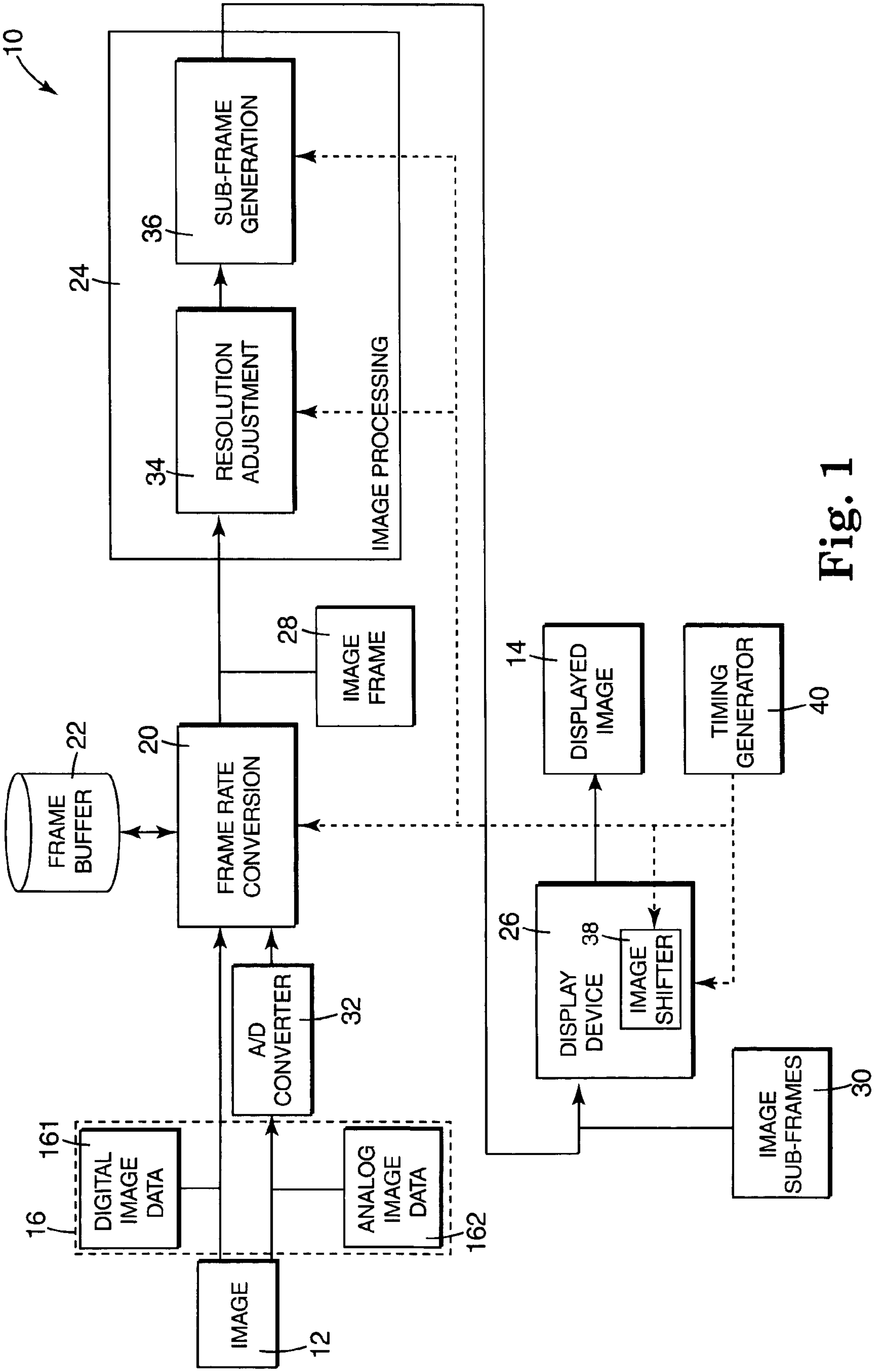
FIG. 1 is a block diagram illustrating an image display system according to certain exemplary embodiments.

FIG. 1 is a block diagram illustrating an image display system 10 according to an exemplary embodiment. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In an exemplary embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In an exemplary embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In an exemplary embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, in this example display device 26 displays an entire sub-frame 30 for image frame 28 at one time.

In certain exemplary embodiments, display device 26 performs one cycle of displaying image sub-frames 30 for each image frame 28. Display device 26 displays image sub-frames 30 so as to be spatially and temporally offset from each other. Display device 26 may also optically steer image sub-frames 30 to create displayed image 14. As such, individual pixels of display device 26 are addressed to multiple locations.

Display device 26 may include an image shifter 38. Image shifter 38 spatially alters or offsets the position of image sub-frames 30 as displayed by display device 26. Here, for example, image shifter 38 may vary the position of display of image sub-frames 30, as described below, to produce displayed image 14.

In certain exemplary embodiments, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In some exemplary embodiments, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

Figure 2C:
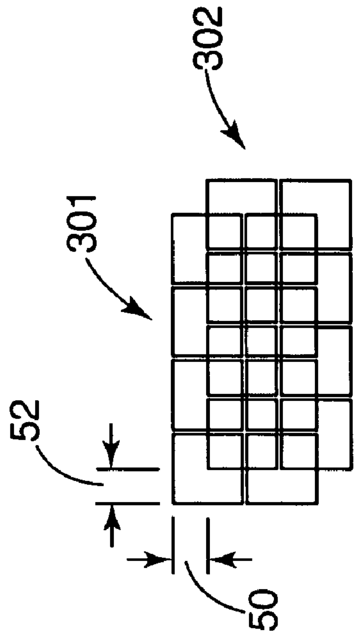
FIGS. 2A-2C are schematic diagrams illustrating the display of two sub-frames according to an exemplary embodiment.
Figure 2B:
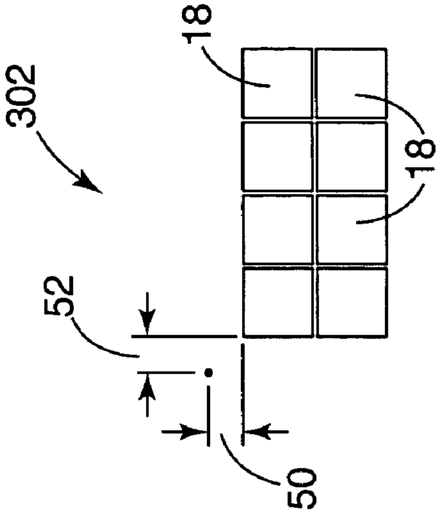
Figure 2A:
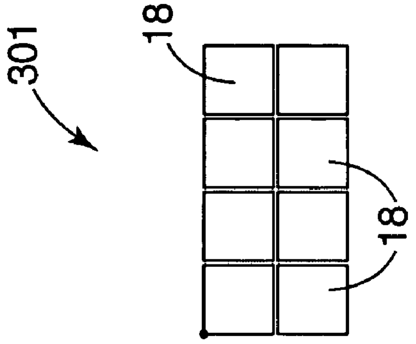

As illustrated in the exemplary embodiments in FIGS. 2A and 2B, image processing unit 24 defines two image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

As illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In an exemplary embodiment, display device 26 performs one cycle of displaying first sub-frame 301 in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In other exemplary embodiments, as illustrated in FIGS. 3A-3D, image processing unit 24 defines four image sub-frames 30 for image frame 28. For example, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

Figure 3A:
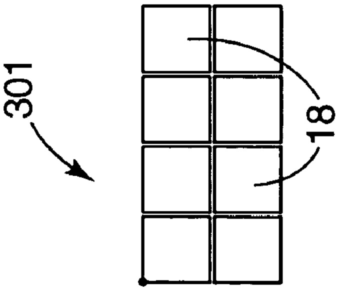
FIGS. 3A-3E are schematic diagrams illustrating the display of four sub-frames according to an exemplary embodiment.
Figure 3B:
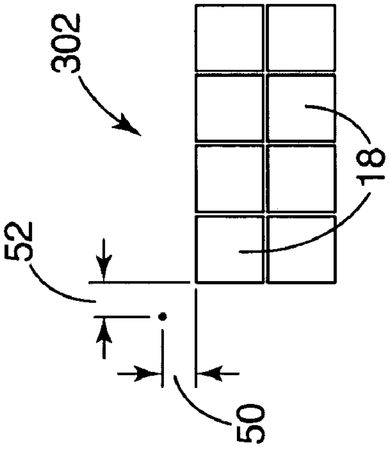
Figure 3C:
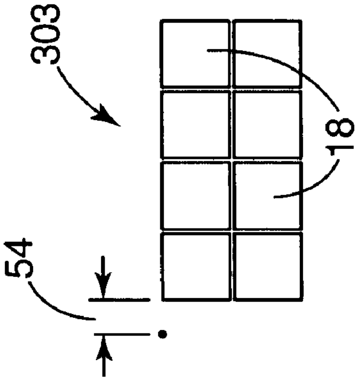
Figure 3D:
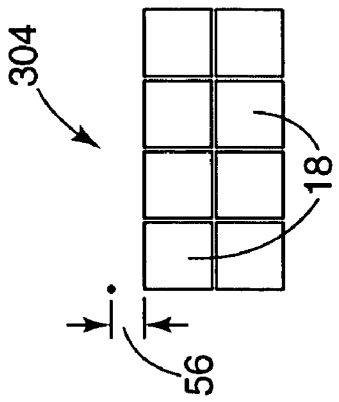

As illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

Figure 3E:
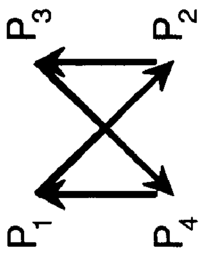

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. Thus, for example, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In certain exemplary embodiments, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4A:
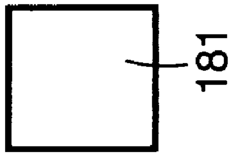
FIGS. 4A-4E are schematic diagrams illustrating the display of a pixel with an image display system according to an exemplary embodiment.
Figure 4B:
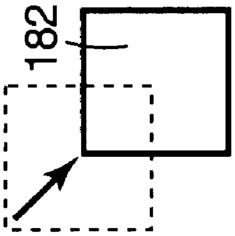
Figure 4C:
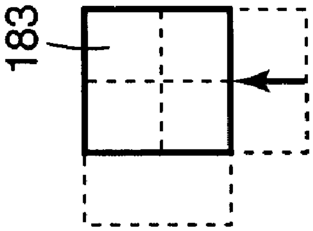
Figure 4D:
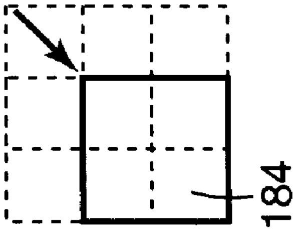
Figure 4E:
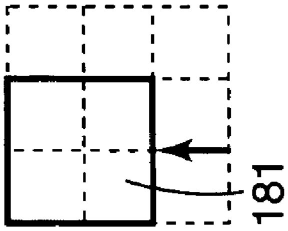

FIGS. 4A-4E illustrate one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components may therefore reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In certain exemplary embodiments, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. Sub-frame generation unit 36 is configured to use any suitable algorithm to generate pixel values for sub-frames 30.

II. Address Generation in a Light Modulator

In certain embodiments, display device 26 includes a light modulator which has an array that includes pixels arranged in rows. The light modulator is configured to operate in one of two modes of operation—a normal mode of operation where one row of the array is activated in response to an address generated from an input signal and a sub-frame mode of operation where two adjacent rows of the array are activated in response to an address generated from the input signal. The sub-frame mode of operation may be used in embodiments where sub-frames are generated and displayed as described above so that individual pixel values may be displayed across two rows of the light modulator.

As noted above, image shifter 38 may be configured to spatially alter or offset the position of image sub-frames 30 displayed by display device 26. By configuring a light modulator of display device 26 to operate in two modes of operation, the function of image shifter 38 may be performed by the light modulator electronically without the need to mechanically shift sub-frames 30.

Figure 5:
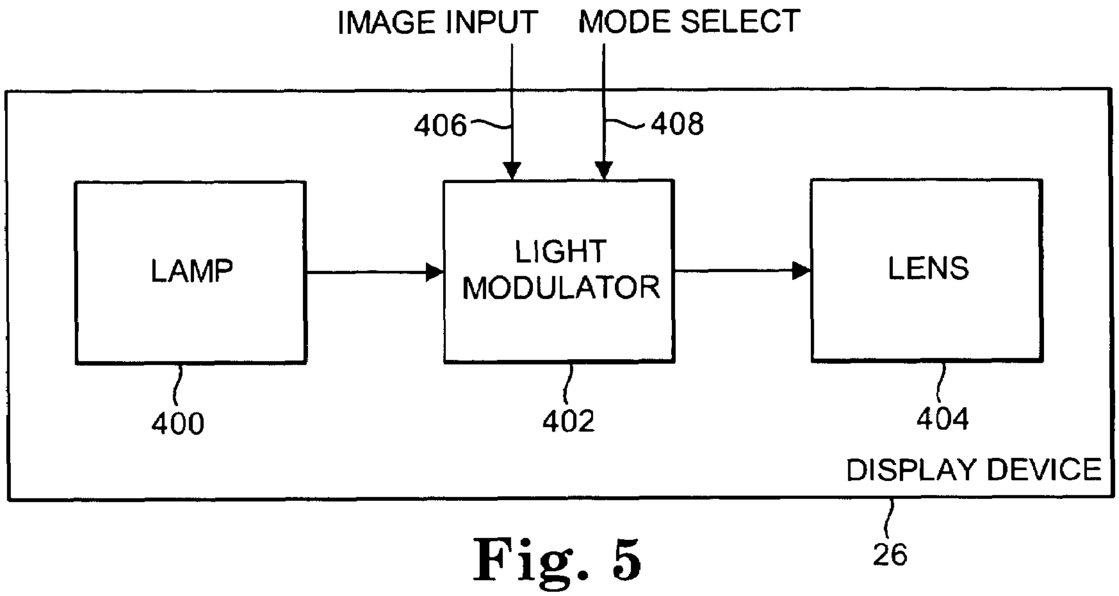
FIG. 5 is a block diagram illustrating a display device according to an exemplary embodiment.

FIG. 5 is a block diagram illustrating an exemplary embodiment of display device 26. In the embodiment of FIG. 5, display device 26 includes a lamp 400, a light modulator 402, and a lens 404. Light modulator 402 receives an image input signal 406 and a mode select signal 408.

Display device 26 receives image input signal 406 and causes images to be displayed on a screen or other surface in response to image input signal 406 using lamp 400, light modulator 402, and lens 404. Here, lamp 400 provides a light source to light modulator 402. Light modulator 402 reflects selected portions of the light source through lens 404 in response to image input signal 406 to cause images to be projected onto a screen or other surface. Lamp 400 may, for example, include a mercury ultra high pressure, xenon, metal halide, or other suitable projector lamp. Light modulator 402 operates in either a normal mode of operation or a sub-frame mode of operation as determined by information from mode select signal 408. Image input signal 406 includes image data and an input address signal, $A_{IN}$, associated with the image data.

Figure 6:
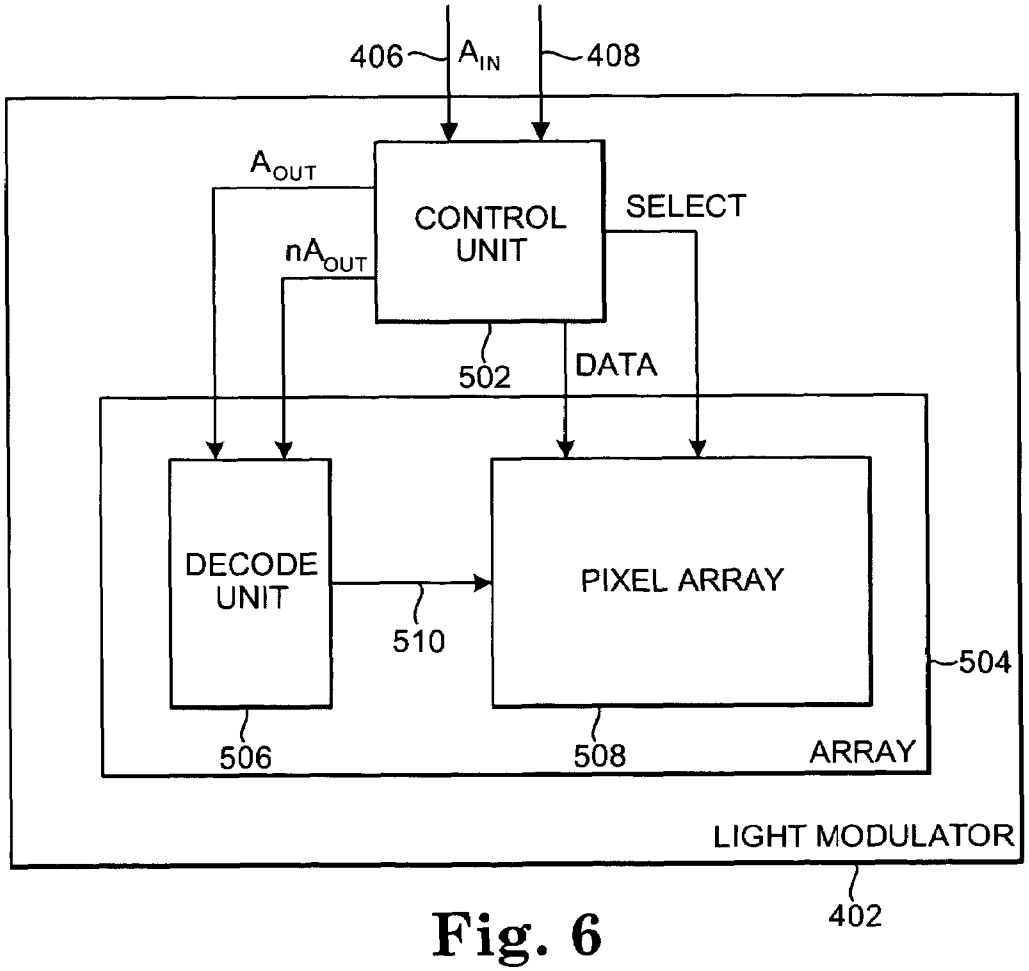
FIG. 6 is a block diagram illustrating a light modulator according to an exemplary embodiment.

FIG. 6 is a block diagram illustrating an exemplary embodiment of light modulator 402. In the embodiment of FIG. 6, light modulator 402 includes a control unit 502 and an array 504. Control unit 502 receives image input signal 406 which includes the input address signal $A_{IN}$ and mode select signal 408. Control unit 502 provides an address signal $A_{OUT}$, an inverted address signal $nA_{OUT}$, a data signal, and a select signal to array 504. Array 504 includes a decode unit 506 and a pixel array 508. Decode unit 506 receives the address signal $A_{OUT}$ and the inverted address signal $nA_{OUT}$ from control unit 502 and provides n-row selector signals 510 to pixel array 508 where n is the number of rows in pixel array 508. Pixel array 508 receives row selector signals 510 from decode unit 506 and the data signal and the select signal from control unit 502. Pixel array 508 includes a plurality of pixels arranged in a plurality of rows.

As noted above, light modulator 402 operates in one of two modes of operation—a normal mode of operation or a sub-frame mode of operation—according to information provided by mode select signal 408. Light modulator 402 may store the information provided by mode select signal 408 in a memory (not shown) accessible to control unit 502. In addition, the information provided by mode select signal 408 may be received by control unit during operation of light modulator 402 or during the manufacturing process of light modulator 402. In the normal mode of operation, light modulator 402 drives one row of pixel array 508 using a row selector signal 510 that is generated in response to the input address $A_{IN}$ from image input signal 406. Image data from image input signal 406 is provided to the selected row in pixel array 508 by control unit 502 using the data and select signals.

In the sub-frame mode of operation, light modulator 402 drives two adjacent rows of pixel array 508 using a row selector signal 510 that is generated in response to the input address $A_{IN}$ from image input signal 406. Image data from image input signal 406 is provided to the adjacent rows in pixel array 508 by control unit 502 using the data and select signals.

Figure 7A:
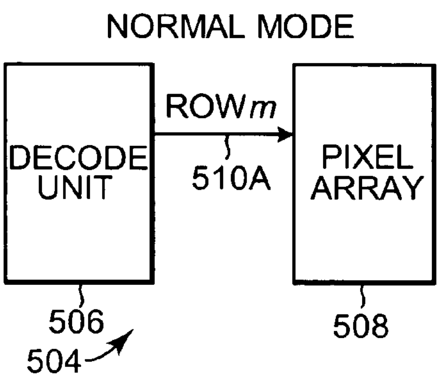
FIG. 7A is a block diagram illustrating a normal mode of operation of a light modulator according to an exemplary embodiment.
Figure 7B:
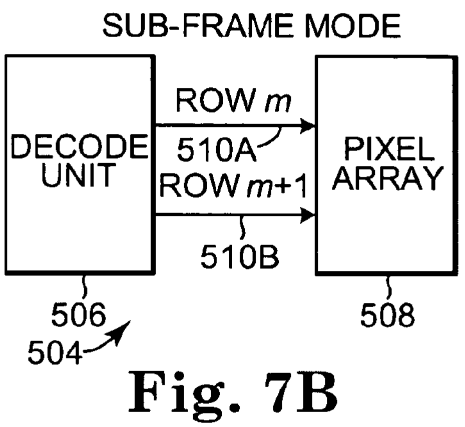
FIG. 7B is a block diagram illustrating a sub-frame mode of operation of a light modulator according to an exemplary embodiment.

FIGS. 7A and 7B are block diagrams illustrating embodiments of the normal mode of operation and the sub-frame mode of operation, respectively, of light modulator 402. In the normal mode of operation shown in FIG. 7A, decode unit 506 generates a row selector signal 510A to activate a row m in response to receiving addresses $A_{OUT}$ and $nA_{OUT}$ from control unit 502 where m represents any of the 0 to n rows of pixel array 508. Decode unit 506 provides row selector signal 510A to pixel array 508 to cause a row m in pixel array 508 associated with row selector signal 510A to be activated.

In the sub-frame mode of operation shown in FIG. 7B, decode unit 506 generates row selector signal 510A to activate row m and a row selector signal 510B to activate a row m+1 in response to receiving addresses $A_{OUT}$ and $nA_{OUT}$ from control unit 502. Decode unit 506 provides row selector signals 510A and 510B to pixel array 508 to cause two adjacent rows in pixel array 508 associated with row selector signals 510A and 510B to be activated. By doing so, light modulator 402 causes a set of data values to be provided to the two rows simultaneously to cause the rows to display the same information.

According to certain exemplary embodiments, light modulator 402 incorporates gray counter addressing in generating addresses $A_{OUT}$ and $nA_{OUT}$ in the sub-frame mode of operation to cause rows in pixel array 508 to be selected. As described below, gray counter addressing differs from binary addressing.

gate and other non-inverted and inverted address signals that associate an nth row of the pixel array with a binary value of n.

With gray counter addressing, row selector signals are generated in response to gray counter values, as shown in the example of Table 1, rather than binary values. Table 1 shows non-inverted and inverted row address values that may be used to generate a row selector signal for each row in a normal mode of operation. FIGS. 8B and 8C are logic diagrams illustrating embodiments of a row selector circuit 540 and a row selector circuit 560, respectively, using gray counter addressing for a pixel array that includes sixteen rows to select row 9 and row 10 of the pixel array, respectively. Referring to Table 1 and row selector circuits 540 and 560, row selector signals to select rows 9 and 10 of pixel array may be generated by selecting appropriate non-inverted and inverted address signal inputs for each row selector circuit 540 and 560 as shown in FIGS. 8B and 8C. Other row selector signals may be similarly generated using an AND gate and other non-inverted and inverted address signals.

In other embodiments, row selector signals may be generated by using NOR gates, NAND gates, and/or other suitable logic elements or the like.

TABLE 1

Gray Counter Addressing, Normal Mode of Operation

| ROW | $A_{OUT}[3]$ | $A_{OUT}[2]$ | $A_{OUT}[1]$ | $A_{OUT}[0]$ | $nA_{OUT}[3]$ | $nA_{OUT}[2]$ | $nA_{OUT}[1]$ | $nA_{OUT}[0]$ |
|---|---|---|---|---|---|---|---|---|
| 0 | 0 | 0 | 0 | 0 | 1 | 1 | 1 | 1 |
| 1 | 0 | 0 | 0 | 1 | 1 | 1 | 1 | 0 |
| 2 | 0 | 0 | 1 | 1 | 1 | 1 | 0 | 0 |
| 3 | 0 | 0 | 1 | 0 | 1 | 1 | 0 | 1 |
| 4 | 0 | 1 | 1 | 0 | 1 | 0 | 0 | 1 |
| 5 | 0 | 1 | 1 | 1 | 1 | 0 | 0 | 0 |
| 6 | 0 | 1 | 0 | 1 | 0 | 0 | 1 | 0 |
| 7 | 0 | 1 | 0 | 0 | 1 | 0 | 1 | 1 |
| 8 | 1 | 1 | 0 | 0 | 0 | 0 | 1 | 1 |
| 9 | 1 | 1 | 0 | 1 | 0 | 0 | 1 | 0 |
| 10 | 1 | 1 | 1 | 1 | 0 | 0 | 0 | 0 |
| 11 | 1 | 1 | 1 | 0 | 0 | 0 | 0 | 1 |
| 12 | 1 | 0 | 1 | 0 | 0 | 1 | 0 | 1 |
| 13 | 1 | 0 | 1 | 1 | 0 | 1 | 0 | 0 |
| 14 | 1 | 0 | 0 | 1 | 0 | 1 | 1 | 0 |
| 15 | 1 | 0 | 0 | 0 | 0 | 1 | 1 | 1 |

Figure 8A:
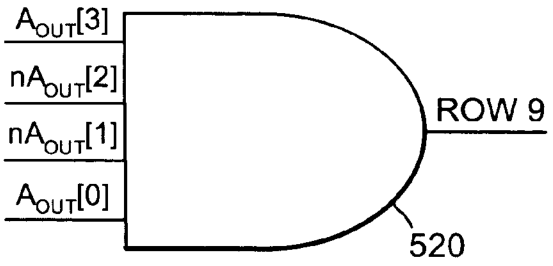
FIG. 8A is a logic diagram illustrating a row selector circuit according to an exemplary embodiment.
Figure 8B:
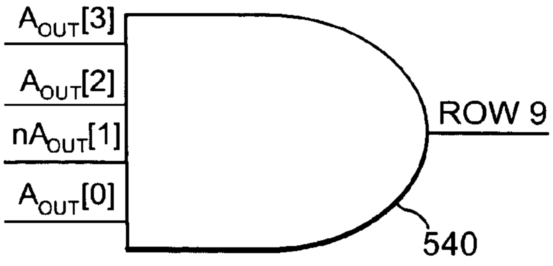
FIG. 8B is a logic diagram illustrating a row selector circuit according to an exemplary embodiment.
Figure 8C:
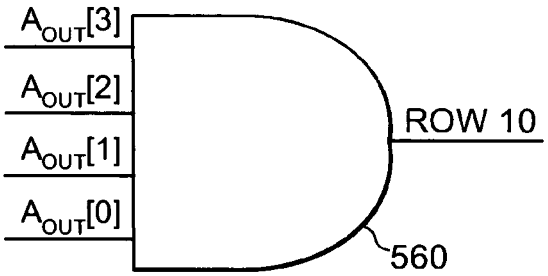
FIG. 8C is a logic diagram illustrating a row selector circuit according to an exemplary embodiment.

FIG. 8A is a logic diagram illustrating an exemplary embodiment of a row selector circuit 520 using binary addressing for an embodiment of pixel array 508 that includes sixteen rows to select row 9 of pixel array 508. In the embodiment of FIG. 8A, row selector circuit 520 includes a four-input AND gate that receives the address inputs $A_{OUT}$[3], $nA_{OUT}$[2], $nA_{OUT}$[1], and $A_{OUT}$[0] where $A_{OUT}$[3] represents the most-significant address bit, $nA_{OUT}$[2] represents an inversion of the second most-significant address bit, $nA_{OUT}$[1] represents an inversion of the second least-significant address bit, and $A_{OUT}$[0] represents the least-significant address bit. By receiving selected non-inverted address signals (i.e., $A_{OUT}$[3] and $A_{OUT}$[0]) and selected inverted address signals (i.e., $nA_{OUT}$[2] and $nA_{OUT}$[1]), row selector circuit 520 generates a row selector signal to activate row 9 in response to receiving an address with a binary value of 9. Other row selectors may be similarly generated using an AND Table 2 shows non-inverted and inverted address values that may be used to generate row selector signals for two rows in a sub-frame mode of operation. In Table 2, the values marked with an asterisk represent values changed from the values shown in Table 1. By using the values shown in Table 2, two adjacent row selector signals may be generated for each set of address values. For example, the values of $A_{OUT}$[3:0]=1111 and $nA_{OUT}$[3:0]=0010 may be used to select rows 9 and 10 using row selector circuits 540 and 560, respectively. Row selector circuit 540 does not receive the non-inverted address value $A_{OUT}$[1], i.e., the non-inverted address value $A_{OUT}$[1] is a "don't care" value from the perspective of row selector circuit 540. By changing the non-inverted address value $A_{OUT}$[1] from the value shown in Table 1 (i.e., "0") to the value shown in Table 2 (i.e., "1"), row selector circuit 560 generates the row selector signal to activate row 10 at the same time that row selector circuit 540 generates the row selector signal to activate row 9. Accordingly, two row selector signals may be similarly generated for the other address values in Table 2 using AND gates and selected non-inverted and inverted address signals as illustrated by the examples shown in FIGS. 8B and 8C.

TABLE 2

| | Gray Counter Addressing, Sub-Frame Mode of Operation | | | | | | | |
|---|---|---|---|---|---|---|---|---|
| ROW | $A_{OUT}[3]$ | $A_{OUT}[2]$ | $A_{OUT}[1]$ | $A_{OUT}[0]$ | $nA_{OUT}[3]$ | $nA_{OUT}[2]$ | $nA_{OUT}[1]$ | $nA_{OUT}[0]$ |
| 0 | 0 | 0 | 0 | 1* | 1 | 1 | 1 | 1 |
| 1 | 0 | 0 | 1* | 1 | 1 | 1 | 1 | 0 |
| 2 | 0 | 0 | 1 | 1 | 1 | 1 | 0 | 1* |
| 3 | 0 | 1* | 1 | 0 | 1 | 1 | 0 | 1 |
| 4 | 0 | 1 | 1 | 1* | 1 | 0 | 0 | 1 |
| 5 | 0 | 1 | 1 | 1 | 1 | 0 | 1* | 0 |
| 6 | 0 | 1 | 0 | 1 | 1 | 0 | 1 | 1* |
| 7 | 1* | 1 | 0 | 0 | 1 | 0 | 1 | 1 |
| 8 | 1 | 1 | 0 | 1* | 0 | 0 | 1 | 1 |
| 9 | 1 | 1 | 1* | 1 | 0 | 0 | 1 | 0 |
| 10 | 1 | 1 | 1 | 1 | 0 | 0 | 0 | 1* |
| 11 | 1 | 1 | 1 | 0 | 0 | 1* | 0 | 1 |
| 12 | 1 | 0 | 1 | 1* | 0 | 1 | 0 | 1 |
| 13 | 1 | 0 | 1 | 1 | 0 | 1 | 1* | 0 |
| 14 | 1 | 0 | 0 | 1 | 0 | 1 | 1 | 1* |
| 15 | 1 | 0 | 0 | 0 | 1* | 1 | 1 | 1 |

Tables 1 and 2 illustrate non-inverted and inverted address values for an embodiment of pixel array 508 that includes sixteen rows.

Figure 9A:
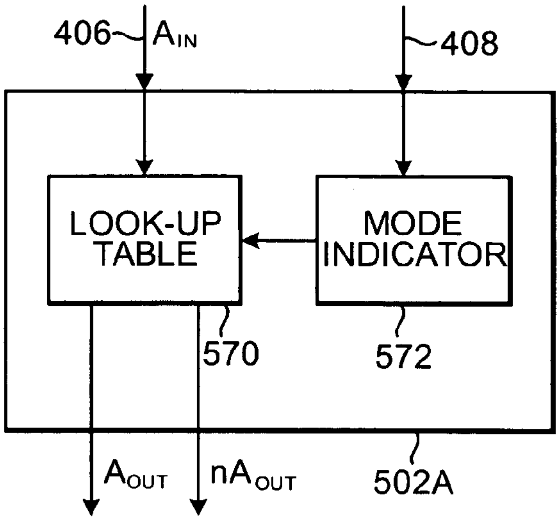
FIG. 9A is a block diagram illustrating a control unit according to an exemplary embodiment.

FIG. 9A is a block diagram illustrating an exemplary embodiment of control unit 502. In the embodiment of FIG. 9A, control unit 502A includes a look-up table 570 and a mode indicator 572. Control unit 502A receives address input $A_{IN}$ as a binary address input and generates addresses $A_{OUT}$ and $nA_{OUT}$ using look-up table 570 and mode indicator 572.

Look-up table 570 includes non-inverted and inverted gray counter addresses and sub-frame and modified sub-frame addresses that correspond to the binary address inputs. For example, look-up table 570 may comprise values such as those shown in FIGS. 1 and 2 above. In response to receiving a binary address input, look-up table 570 provides either non-inverted and inverted gray counter addresses or sub-frame and modified sub-frame addresses corresponding to the binary address input to decode unit 506 according to information from mode indicator 572.

Mode indicator 572 includes stored information that indicates whether light modulator 402 is operating in the normal or sub-frame mode of operation. Mode indicator 572 is provided to look-up table 570 to cause look-up table 570 to select either the addresses associated with the normal mode of operation or the sub-frame mode of operation. More particular, mode indicator 572 causes the non-inverted and inverted gray counter addresses to be provided as $A_{OUT}$ and $nA_{OUT}$, respectively, in the normal mode of operation. In the sub-frame mode of operation, mode indicator 572 causes the sub-frame and modified sub-frame addresses from look-up table 570 to be provided as $A_{OUT}$ and $nA_{OUT}$, respectively.

Figure 9B:
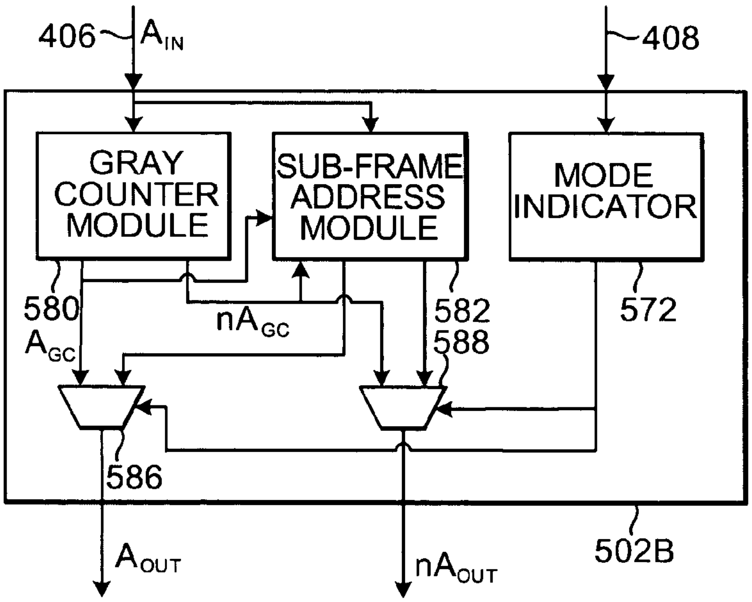
FIG. 9B is a block diagram illustrating a control unit according to an exemplary embodiment.

FIG. 9B is a block diagram illustrating another embodiment of control unit. In the embodiment of FIG. 9B, control unit 502B includes a gray counter module 580, a sub-frame address module 582, mode indicator 572, and a pair of multiplexers 586 and 588.

In the embodiment of FIG. 9B, control unit 502B receives address input $A_{IN}$ as a binary address input and generates addresses $A_{OUT}$ and $nA_{OUT}$ using gray counter module 580, sub-frame address module 582, mode indicator 572, and multiplexors 586 and 588. In particular, gray counter module 580 generates a non-inverted gray counter address and an inverted gray counter address using the binary address input $A_{IN}$, and sub-frame address module 582 generates a sub-frame address and a modified sub-frame address using the binary address input $A_{IN}$ and the non-inverted and inverted gray counter addresses generated by gray counter module 580.

In the normal mode of operation, mode selector 574 causes multiplexers 586 and 588 to provide the non-inverted and inverted gray counter addresses, respectively, as the addresses $A_{OUT}$ and $nA_{OUT}$. Equations I and II may be used, for example, to generate addresses $A_{OUT}$ and $nA_{OUT}$ for normal mode addressing in embodiments of pixel array 508 that include $2^{(n+1)}$ rows where n is an integer.

$$A_{OUT}[n{:}0]=A_{GC}[n{:}0] \qquad \text{Equation I}$$

$$nA_{OUT}[n{:}0]=nA_{GC}[n{:}0] \qquad \text{Equation II}$$

In the sub-frame mode of operation, mode selector 574 causes multiplexors 586 and 588 to provide the sub-frame and modified sub-frame addresses, respectively, as the addresses $A_{OUT}$ and $nA_{OUT}$. Equations III and IV may be used, for example, to addresses $A_{OUT}$ and $nA_{OUT}$ for sub-frame mode addressing in embodiments of pixel array 508 that include $2^{(n+1)}$ rows where n is an integer. Here, sub-frame address module generates the sub-frame address using Equation III and the modified sub-frame address using Equation IV.

$$A_{OUT}[n{:}0]=A_{GC}[n{:}0]|\{!A_{IN}[n]*(\&A_{IN}[(n-1){:}0]),$$
$$!A_{IN}[n-1]*\&A_{IN}[(n-2){:}0],$$
$$!A_{IN}[n-2]*\&A_{IN}[(n-3){:}0],$$
$$\ldots$$
$$!A_{IN}[2]*\&A_{IN}[1{:}0],$$
$$!A_{IN}[1]*A_{IN}[0],$$
$$A_{IN}[0] \qquad \text{Equation III}$$

$$nA_{OUT}[n{:}0]=nA_{GC}[n{:}0]|\{!A_{IN}[n]*(\&A_{IN}[(n-1){:}0]),$$
$$!A_{IN}[n-1]*\&A_{IN}[(n-2){:}0],$$
$$!A_{IN}[n-2]*\&A_{IN}[(n-3){:}0],$$
$$\ldots$$

$!A_{IN}[2]*\&A_{IN}[1:0],$ $!A_{IN}[1]*A_{IN}[0],$ $A_{IN}[0]\}$ Equation IV

In Equations III and IV, the symbol "|" represents a bitwise OR operation, the symbols "*" and "&" represent a bitwise AND operations, and the symbol"!" in represents a bitwise NOT operation.

In the embodiment of FIG. 9B, the input address $A_{IN}$ includes a binary address. In other embodiments, the functions of gray counter module 580 may be performed externally from control unit 502B by either another functional unit within light modulator 402 or another functional unit in display device 26. In these embodiments, both the binary address and the gray counter address are provided to control unit 502B.

Referring back to FIG. 6, light modulator 402, and more specifically control unit 502 and decode unit 506, implements gray counter addressing in the normal mode of operation and modifies the gray counter addressing using either a look-up table or Equations III and IV as described in the embodiments of FIGS. 9A and 9B, respectively, in the sub-frame mode of operation.

Figure 10:
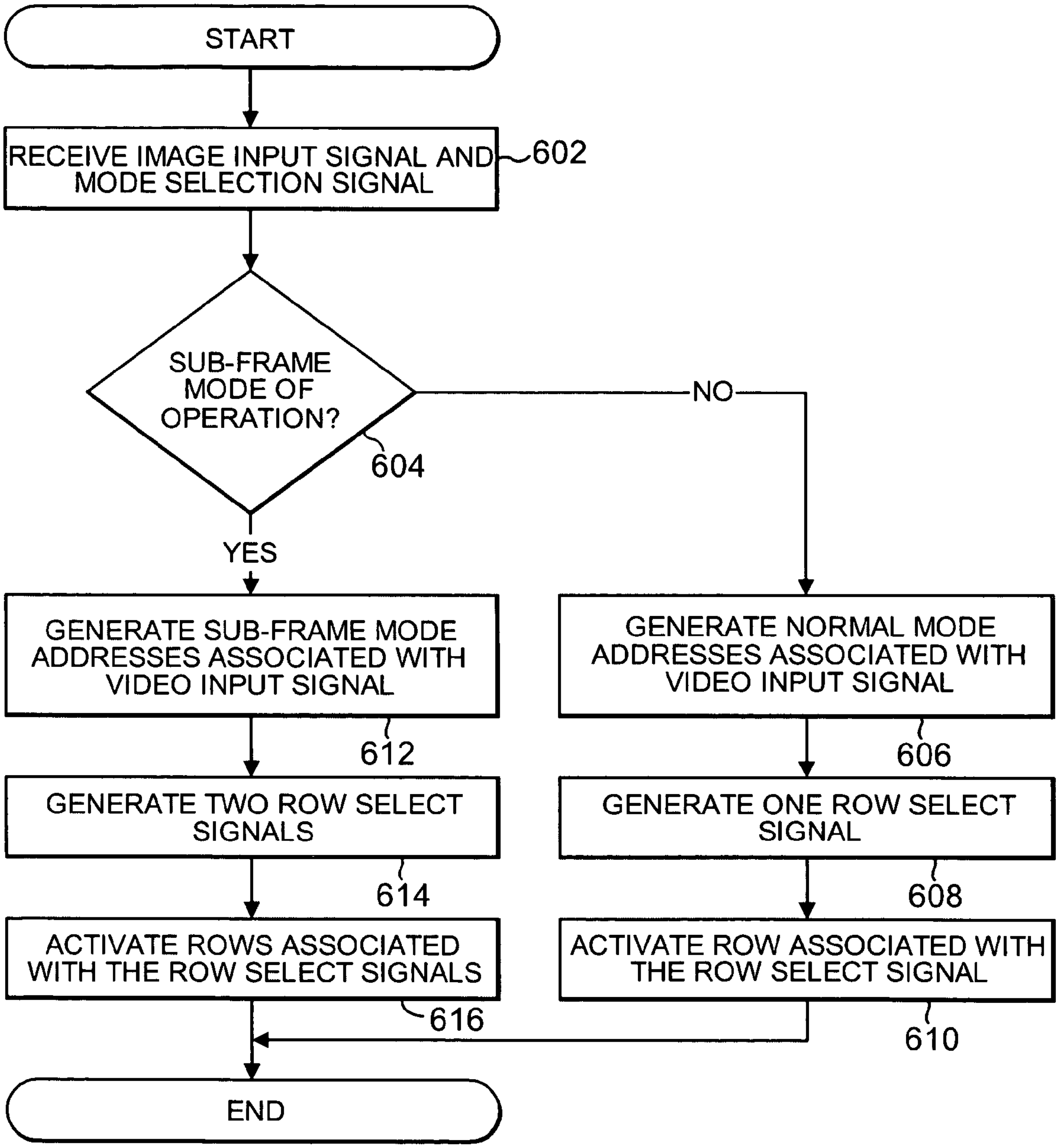
FIG. 10 is a flow chart illustrating a method performed by a light modulator according to an exemplary embodiment.

FIG. 10 is a flow chart illustrating an exemplary embodiment of a method performed by light modulator 402. In the embodiment of FIG. 10, light modulator 402, i.e., control unit 502, receives image input signal 406 and mode select signal 408 as indicated in a block 602. A determination is made by light modulator 402 as to whether mode select signal 408 indicates a sub-frame mode of operation as indicated in a block 604. More specifically, in this example control unit 502 determines whether light modulator 402 is operating in a normal or a sub-frame mode of operation using information from mode select signal 408.

If the mode select signal does not indicate a sub-frame mode of operation, then light modulator 402 generates normal mode addresses as indicated in a block 606 and generates one row select signal as indicated in a block 608. More specifically, control unit 502 generates a gray counter row address from image input signal 406, i.e. $A_{OUT}$, using Equation I above and an inversion of the gray counter row address from image input signal 406, i.e. $nA_{OUT}$, using Equation II above and provides the gray counter row address and the inversion to decode unit 506 in array 504.

Decode unit 506 generates row selector signal 510 in response to receiving the gray counter row address and the inversion from control unit 502 and provides row selector signal 510 to pixel array 508. In certain exemplary embodiments, decode unit 506 includes an AND gate decode unit that includes AND gate row selector circuits similar to those shown in FIGS. 8B and 8C. In another embodiment, decode unit 506 includes a NOR gate decode unit that includes NOR gate row selector circuits. In a further embodiment, decode unit 506 includes a NAND gate decode unit that includes NAND gate row selector circuits. In other embodiments, decode unit 506 may comprise a decode unit that includes other logic elements.

Light modulator 402 activates the row associated with row select signal 510 as indicated in a block 610. More specifically, pixel array 508 drives or activates a row associated with row selector signal 510 to cause light from pixels in the row to be reflected through lens 404 as selected by the data and select signals from control unit 508 in response to receiving row selector signal 510.

If the mode select signal indicates a sub-frame mode of operation, then light modulator 402 generates sub-frame mode addresses as indicated in a block 612 and generates two row select signals as indicated in a block 614. More specifically, control unit 502 generates a sub-frame row address from image input signal 406, i.e. $A_{OUT}$, using Equation III above and a modified inversion of the sub-frame row address from image input signal 406, i.e. $nA_{OUT}$, using Equation IV above and provides the sub-frame row address and the modified inversion to decode unit 506 in array 504.

In an exemplary embodiment, control unit 502 generates the sub-frame row address using the corresponding gray counter row address from the normal mode of operation and generates the modified inversion using the inversion of the corresponding gray counter row address from the normal mode of operation. In this example, control unit 502 either changes one bit in the corresponding gray counter row address to generate the sub-frame row address and uses the inversion of the corresponding gray counter row address as the modified inversion or uses the corresponding gray counter row address as the sub-frame row address and changes one bit in the inversion of the corresponding gray counter row address to generate the modified inversion. Example values of this embodiment may be seen in Tables 1 and 2 and may be calculated using Equations III and IV. In this way, the sub-frame row address includes a portion that is an inversion of a corresponding portion of the modified inversion and a portion that is equal to a portion (i.e., one bit) of the modified inversion.

Decode unit 506 generates row selector signals 510A and 510B in response to receiving the sub-frame row address and the modified inversion from control unit 502 and provides row selector signals 510A and 510B to pixel array 508. Light modulator 402 activates the rows associated with the row select signals 510A and 510B as indicated in a block 616. More specifically, pixel array 508 drives or activates the rows associated with row selector signals 510A and 510B to cause light from pixels in the rows to be reflected through lens 404 as selected by the data and select signals from control unit 508 in response to receiving row selector signal 510A and 510B.

Although specific embodiments have been illustrated and described herein for purposes of description of some exemplary embodiments, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the exemplary embodiments discussed herein. Therefore, it is manifestly intended that this invention be limited only by the claims and the equivalents thereof.

What is claimed is:

1. A light modulator comprising:

a control unit configured to receive an image input signal; and an array comprising a plurality of pixels arranged in a plurality of rows;

wherein the control unit is configured to provide a first address associated with the image input signal and an inversion of the first address to the array in response to detecting a first mode of operation, wherein the control unit is configured to provide a second address associated with the image input signal and a third address to the array in response to detecting a second mode of operation, wherein the array is configured to drive a first one of the plurality of rows in response to receiving the first address and the inversion of the first address, wherein the array is configured to drive the first one of the plurality of rows and a second one of the plurality of rows in response to receiving the second address and the third address, wherein a first portion of the third address includes an inversion of a first portion of the second address, and wherein a second portion of the third address is equal to a second portion of the second address.

2. The light modulator of claim 1 wherein the first one of the plurality of rows is adjacent to the second one of the plurality of rows.

3. The light modulator of claim 1 wherein the second portion of the third address includes a single bit.

4. The light modulator of claim 1 wherein the first mode of operation includes a normal mode of operation, and wherein the second mode of operation includes a sub-frame mode of operation.

5. The light modulator of claim 1 wherein the control unit is configured to detect the second mode of operation in response to receiving a mode select signal.

6. The light modulator of claim 1 wherein the control unit is configured to detect the second mode of operation using information accessible by the control unit.

7. The light modulator of claim 1 wherein the array includes a decode unit and a pixel array that includes the plurality of pixels, wherein the decode unit is configured to provide a first row selector signal to the pixel array in response to receiving the first address and the inversion of the first address, and wherein the decode unit is configured to provide the first row selector signal and a second row selector signal to the pixel array in response to receiving the second address and the third address.

8. The light modulator of claim 7 wherein the decode unit includes an AND gate decode unit.

9. The light modulator of claim 7 wherein the decode unit includes an NOR gate decode unit.

10. The light modulator of claim 7 wherein the decode unit includes an NAND gate decode unit.

11. A method performed by a light modulator comprising:

receiving an image input signal;

generating a first address in response to detecting a first mode of operation;

generating a second address by inverting the first address in response to detecting the first mode of operation;

providing the first address and the second address to an array having a plurality of pixels arranged in a first row and a second row in response to detecting the first mode of operation;

generating a third address in response to detecting a second mode of operation;

generating the fourth address by inverting the third address and setting a portion of the fourth address equal to a corresponding portion of the third address in response to detecting the second mode of operation;

providing the third address and the fourth address to the array in response to detecting the second mode of operation;

activating the first row in response to receiving the first address and the second address at the array; and activating the first row and the second row in response to receiving the third address and the fourth address at the array.

12. The method of claim 11 wherein the first one of the plurality of rows is adjacent to the second one of the plurality of rows.

13. The method of claim 11 wherein the first mode of operation includes a normal mode of operation, and wherein the second mode of operation includes a sub-frame mode of operation.

14. The method of claim 11 further comprising:

detecting the second mode of operation in response to receiving a mode select signal.

15. The method of claim 11 further comprising:

detecting the second mode of operation by accessing information stored in the light modulator.

16. A light modulator comprising:

an array comprising a plurality of pixels arranged in a plurality of rows;

means for providing a first address associated with an input signal and an inversion of the first address to the array in response to detecting a first mode of operation; and means for providing a second address associated with the input signal and a third address to the array in response to detecting a second mode of operation;

wherein the array is configured to drive a first one of the plurality of rows in response to receiving the first address and the inversion of the first address, wherein the array is configured to drive the first one of the plurality of rows and a second one of the plurality of rows in response to receiving the second address and the third address, wherein a first portion of the third address includes an inversion of a first portion of the second address, and wherein a second portion of the third address is equal to a second portion of the second address.

17. The light modulator of claim 16 wherein the first one of the plurality of rows is adjacent to the second one of the plurality of rows.

18. The light modulator of claim 16 wherein the second portion of the third address includes a single bit.

19. The light modulator of claim 16 wherein the first mode of operation includes a normal mode of operation, and wherein the second mode of operation includes a sub-frame mode of operation.

20. The light modulator of claim 16 wherein the means for providing the second address and the third address includes means for detecting the second mode of operation in response to receiving a mode select signal.

21. The light modulator of claim 16 wherein the means for providing the second address and the third address includes means for detecting the second mode of operation using information stored by the light modulator.

22. The light modulator of claim 16 wherein the array includes a decode unit and a pixel array that includes the plurality of pixels, wherein the decode unit is configured to provide a first row selector signal to the pixel array in response to receiving the first address and the inversion of the first address, and wherein the decode unit is configured to provide the first row selector signal and a second row selector signal to the pixel array in response to receiving the second address and the third address.

23. A display device comprising:

a lamp;

a lens; and a light modulator comprising an array comprising a plurality of pixels arranged in a plurality of rows;

wherein the light modulator is configured to generate a first address associated with an image input signal in response to detecting a first mode of operation; wherein the light modulator is configured to generate a second address by inverting the first address in response to detecting a first mode of operation; wherein the light modulator is configured to generate a third address associated with the image input signal to the array in response to detecting a second mode of operation; wherein the light modulator is configured to generate a fourth address by inverting the third and setting a portion of the fourth address equal to a corresponding portion of the third address in response to detecting the second mode of operation; wherein the light modulator is configured to reflect light from the lamp through the lens using a first one of the plurality of rows in response to receiving the first and the second addresses, and wherein the light modulator is configured to reflect light from the lamp through the lens using the first one of the plurality of rows and a second one of the plurality of rows in response to receiving the third and the fourth addresses.

24. The display device of claim 23 wherein the first one of the plurality of rows is adjacent to the second one of the plurality of rows.

25. The display device of claim 23 wherein the first mode of operation includes a normal mode of operation, and wherein the second mode of operation includes a sub-frame mode of operation.

26. The display device of claim 23 wherein the portion of the fourth address includes a single bit.

* * * * *

UNITED STATES PATENT AND TRADEMARK OFFICE

CERTIFICATE OF CORRECTION

PATENT NO. : 7,453,478 B2
APPLICATION NO. : 10/902349
DATED : November 18, 2008
INVENTOR(S) : Eric T. Martin et al.

It is certified that error appears in the above-identified patent and that said Letters Patent is hereby corrected as shown below:

In column 12, line 60, in equation III, delete "$A_{IN}[0]$" and insert -- $A_{IN}[0]\}$ --, therefor.

In column 17, line 5, in Claim 23, after "third" insert -- address --.

Signed and Sealed this

Twenty-third Day of February, 2010

David J. Kappos

*Director of the United States Patent and Trademark Office*